May 27, 1924.

C. MACMILLAN

INDUCTION MOTOR

Filed Aug. 4, 1921

1,495,861

Inventor:
Campbell Macmillan,
by Albert G. Davis
His Attorney.

Patented May 27, 1924.

1,495,861

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

INDUCTION MOTOR.

Application filed August 4, 1921. Serial No. 489,816.

*To all whom it may concern:*

Be it known that I, CAMPBELL MACMILLAN, a citizen of the United States, residing at Schenectady, in the county of Schenectady, State of New York, have invented certain new and useful Improvements in Induction Motors, of which the following is a specification.

This invention relates to an induction motor, and more particularly to an induction motor making use of a squirrel cage secondary.

In squirrel cage induction motors of the ordinary form, difficulty is usually experienced in that the starting current tends to be high and the starting torque rather low. To obviate these difficulties, several arrangements have been suggested. For example, one arrangement is that shown in the application of Philip L. Alger, Serial No. 489,863, filed August 4, 1921, entitled Induction motor and assigned to the same assignee as the present application. In the Alger device a single squirrel cage motor is made to have good starting and running characteristics by means of the proper choice of the shape of the conductors making up the squirrel cage. My invention constitutes an improvement on the device shown in the Alger application, so that standard material may be utilized. Furthermore, with my invention it is possible to use slightly shallower slots on the core of the secondary member. For the best results, the slots of the secondary core should be nearly closed and narrow. It is difficult to punch a slot having a very thin opening. Thus another object of my invention is to facilitate the punching of these laminations for building up a core having nearly closed slots. Other objects and advantages of my invention will become apparent as the description proceeds.

Figure 1:
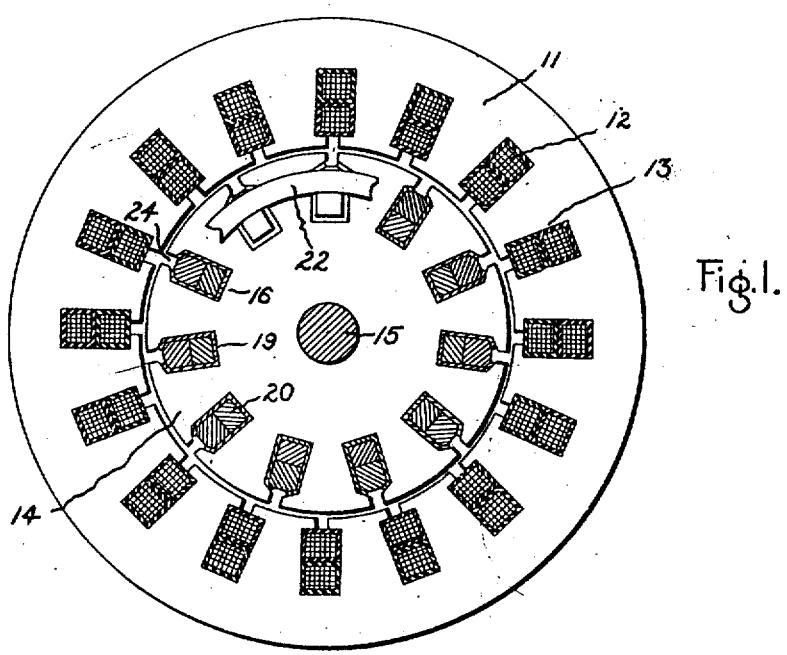
Figure 2:
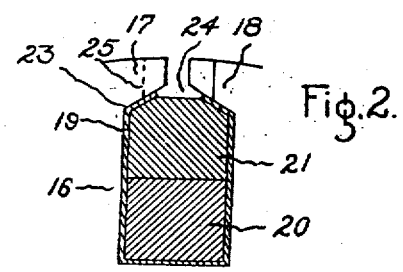
Figure 3:
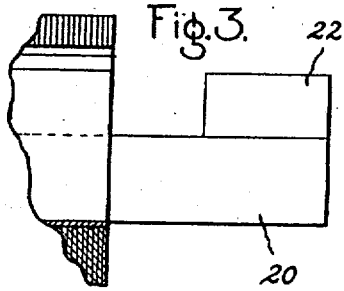
Figure 4:
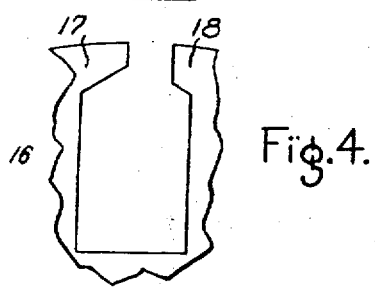

For a better understanding of my invention, reference is to be had to the following specification together with the accompanying drawing, in which Fig. 1 is a diagrammatic view showing the arrangement of the stator and the rotor members of my improved induction motor; Fig. 2 is an enlarged cross section of one of the slots of the secondary member and its conductors; Fig. 3 is a fractional sectional view of the secondary member showing how the end rings are fastened to the conductors; and Fig. 4 is an enlarged view of one of the teeth in the laminations making up the secondary core.

Referring now more in detail to the drawings, in which like reference characters refer to like parts throughout, I indicate at 11 the stator member of the induction motor. This stator member carries appropriate windings 12 located in slots 13. The stator member may be wound in any well known appropriate manner and the particular arrangement of the windings thereon forms no part of my invention. Within the stator is located the core 14 for the secondary member of the induction motor, said core being mounted upon the shaft 15. The core member has a plurality of slots 16 which carry the conductor bars making up the squirrel cage. These slots as shown are nearly closed and have overhanging portions 17 and 18 which project from the inside surface of the slots at an oblique angle, as clearly shown in Fig. 4.

In order that the induction motor be operated with a low starting current and a high torque, it is necessary that the squirrel cage have a relatively high resistance during the starting period. For efficient operation at full speed it is, however, necessary that the resistance be considerably reduced. This effect as pointed out in the Alger application referred to hereinbefore may be obtained by providing a compound conductor in the slot, part of the conductor being relatively narrow and deep so that its apparent resistance at the start may be increased due to eddy currents, while another portion is relatively wide and shallow and so arranged that it has a high reactance during the starting period. In the present instance the conductor which has a high equivalent resistance during the starting period comprises a U-shaped conductor 19 which lines the inside of each slot. At the upper end of the limbs the member 19 follows the contour of the nearly closed slot. This U-shaped member has a relatively high resistance and is preferably made by splitting a thin copper tube and forming it into the proper shape before inserting it into the slot.

The conductor of relatively low resistance making up the second part of the compound conductor is represented by 20 and is enclosed between the limbs of the U-shaped conductor 19. This member is caused to have a relatively high reactance during the starting period by the insertion of an iron wedge or filler bar 21 which serves to fill up substantially all of the remainder of the space in the slots. The arrangement is such that there is a tight fit all around the three members 19, 20 and 21 carried in the slots so that there is intimate mechanical contact of a considerable amount between the conductors 20 and 19 as well as between the conductor 19 and the walls of the slot. The arrangement furthermore makes use of ordinary standard material.

During the starting period heavy eddy currents are produced into the conductor 19. This of course increases its apparent resistance, and good starting torque is obtained. At the same time there is sufficient reactance present in the bars 20 so that the starting current is held to a low value. For normal operation the main portion of the energy current passes through the conductors 20.

On account of the large area of contact between the conductor 19 and the conductor 20 it is necessary to connect only conductor 20 to the end ring 22 as shown in Fig. 2. The end ring is shown as placed on the outside of the bars so that the end ring reactance may be reduced. Furthermore, the dissipation of energy during the starting period occurs from the conductor 19, and it is of primary importance that intimate contact between this conductor with the adjoining material be made so as to dissipate this energy. By firmly pressing the conductor 19 against the walls of the slot, in the manner hereinbefore explained, this effect is obtained. A saving in the depth of the slots results from the fact that the bent-over portions 23 of the conductor 19 occupy less radial depth than an equivalent depth if they were parallel with the slot sides.

It is ordinarily objectionable to construct dies that punch unusually narrow slots, such as is required in the present instance at 24 of Figs. 1 and 2. I indicate one means by which it is unnecessary to punch these extremely narrow slots. Thus in Fig. 4 is shown one of the slots in a lamination. In this case the center of the narrow slot is slightly offset from the center of the wide portion of the slot, and the narrow portion 24 is made wider than that required. During the assembly of the punchings, alternate layers are turned over so that the laminations overlap to an extent sufficient to reduce the width of the slot to the desired amount. Thus in Fig. 2 I indicate by means of the dotted line 25 where the edge of the offset slot comes in the layer below, that shown.

While I have shown in the accompanying drawing but one embodiment of my invention, I do not wish to be limited thereto but aim to embrace in the appended claims all modifications falling fairly within the spirit and scope of my invention.

What I claim as new and desire to secure by Letters Patent of the United States, is:—

1. A secondary member for a dynamo electric machine comprising a core structure, conductor bars of low resistance carried by said core structure and forming a squirrel cage of comparatively high reactance during the starting period, and relatively narrow conductors of comparatively high resistance bent so that each encloses a low resistance bar, and means for insuring that the high resistance conductors are pressed firmly against the low resistance bars and against the core structure, whereby good electrical contact between the conductors is obtained as well as intimate mechanical contact between the high resistance conductor and the core.

2. A secondary member for a dynamo electric machine comprising a core structure having nearly closed slots, conductors of comparatively large resistance lining said slots for substantially their entire periphery, a conductor bar in each slot forming a squirrel cage, and bars of magnetic material substantially filling up the remainder of the space in the slots.

In witness whereof, I have hereunto set my hand this 2nd day of August, 1921.

CAMPBELL MACMILLAN.